(12) United States Patent
Zhang et al.

(10) Patent No.: US 7,408,952 B2
(45) Date of Patent: Aug. 5, 2008

(54) WIRELESS COMMUNICATION METHOD AND APPARATUS FOR SCHEDULING PRIORITIZED DATA FOR A PLURALITY OF MOBILE STATION USERS

(75) Inventors: Guodong Zhang, Farmingdale, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 368 days.

(21) Appl. No.: 11/231,590

(22) Filed: Sep. 21, 2005

(65) Prior Publication Data

US 2007/0025336 A1  Feb. 1, 2007

Related U.S. Application Data

(60) Provisional application No. 60/702,857, filed on Jul. 27, 2005.

(51) Int. Cl.
*H04Q 7/00* (2006.01)
(52) U.S. Cl. .................. 370/464; 370/352; 370/395; 370/468
(58) Field of Classification Search .............. 370/464, 370/352, 468, 395
See application file for complete search history.

(56) References Cited

U.S. PATENT DOCUMENTS

2005/0004970 A1* 1/2005 Jain et al. .................. 709/200
2005/0059408 A1* 3/2005 Tiedemann et al. ......... 455/452.1
2005/0063389 A1* 3/2005 Elliott et al. ............. 370/395.4
2005/0129063 A1* 6/2005 Razoumov et al. ......... 370/468
2005/0169301 A1* 8/2005 Jain et al. .................. 370/464

OTHER PUBLICATIONS

Jeon et al., "Design of Packet Transmission Scheduler for High Speed Downlink Packet Access Systems", Vehicular Technology Conference, IEEE, Spring 2002, pp. 1125-1129.
Ramiro-Moreno et al., "Network Performance of Transmit and Receive Antenna Diversity in HSDPA Under Different Packet Scheduling Strategies", Vehicular Technology Conference, IEEE, Spring 2003, pp. 1454-1458.
Berger et al., "Interaction of Transmit Diversity and Proportional Fair Scheduling", Vehicular Technology Conference, IEEE, Spring 2002, pp. 2423-2427.

* cited by examiner

*Primary Examiner*—Duc Nguyen
*Assistant Examiner*—Julio R Perez
(74) *Attorney, Agent, or Firm*—Volpe and Koenig, P.C.

(57) ABSTRACT

A wireless communication method and apparatus for scheduling data having different priorities for a plurality of wireless transmit/receive units (WTRUs), (i.e., users) is disclosed. The normalized average active throughput for each of the WTRUs is computed. Then, the normalized channel quality for each of the WTRUs is computed based on a reported channel quality indicator (CQI) and the respective normalized average active throughput. A sequence of WTRUs is arranged in an order of decreasing normalized channel quality for each data priority. As much of the data as possible is scheduled for the WTRUs in the order of decreasing normalized channel quality of WTRUs. The scheduling is performed until there are no more physical resources available. Several of the WTRUs can be scheduled in the same transmission timing interval (TTI) if there are enough physical resources.

15 Claims, 3 Drawing Sheets

WIRELESS COMMUNICATION METHOD AND APPARATUS FOR SCHEDULING PRIORITIZED DATA FOR A PLURALITY OF MOBILE STATION USERS

CROSS REFERENCE TO RELATED APPLICATION

This application claims the benefit of U.S. provisional application No. 60/702,857 filed Jul. 27, 2005, which is incorporated by reference as if fully set forth.

FIELD OF INVENTION

The present invention is related to a wireless communication system including at least one Node-B and a plurality of wireless transmit/receive units (WTRUs), (i.e., users). More particularly, the present invention is related to scheduling data for a plurality of WTRUs based on the priority of the data.

BACKGROUND

The basic principle of high speed downlink packet access (HSDPA) is that the Node-B can make more efficient decisions and manage downlink radio resources on a short-term basis better than the radio network controller (RNC). In the meantime, the RNC still retains coarse overall control of a cell so that it can perform functions such as call admission control (CAC) and congestion control.

With the implementation of HSDPA, fast scheduling via layer 1 signaling becomes possible, which is a key advantage of HSDPA. In order to fully utilize this advantage, a well-designed scheduling algorithm for HSDPA is required.

One scheduling algorithm that has been proposed for HSDPA is a maximum C/I (carrier to interference ratio) algorithm which always schedules the WTRU with the highest channel quality, (i.e., C/I). Although this algorithm takes advantage of instantaneous channel quality, it does not consider fairness between WTRU users.

Another scheduling algorithm that has been proposed for HSDPA is a round robin algorithm disclosed in a publication entitled "Network Performance of Transmit and Receive Antenna Diversity in HSDPA under Different Packet Scheduling Strategies," by J. Ramiro et al., VTC 2001, where each WTRU uses the same resources. Although fairness is achieved between WTRU users, this algorithm totally ignores channel quality in scheduling.

Yet another scheduling algorithm that has been proposed for HSDPA is a proportionally fair algorithm which schedules the WTRU with the highest normalized C/I, as disclosed in a publication entitled "Interaction of Transmit Diversity and Proportional Fair Scheduling," by L. Berger et al., VTC Fall 2002, and in another publication entitled "Design of Packet Transmission Scheduler for High Speed Downlink Packet Access System," by W. S. Jeon et al., VTC Spring 2002.

The normalized C/I of the WTRU is the C/I normalized by the WTRU's average throughput within a specific time window. This algorithm is a promising solution to the scheduling of HSDPA. It balances between instantaneous channel quality and overall fairness among WTRU users. However, it has at least three deficiencies.

The first deficiency is that only one WTRU with the best normalized channel quality is scheduled at a time, which may not have enough data to utilize all the physical resources reserved for HSDPA.

The second deficiency is that a WTRU's average throughput within a specific time window does not consider that different WTRUs may have different data rates, and thus it is not fair for WTRU users with higher data rates.

The third deficiency is that the bursty nature of data traffic is not considered. The average throughput during inactive time, (e.g., reading time), is meaningless. A WTRU that just transitions from an inactive state (reading time) into an active state (data bursts) will get unjustified preference in scheduling.

SUMMARY

The present invention is related to a wireless communication method and apparatus for scheduling data having different priorities for a plurality of WTRUs, (i.e., users). The normalized average active throughput for each of the WTRUs is computed. Then, the normalized channel quality for each of the WTRUs is computed based on a reported channel quality indicator (CQI) and the respective normalized average active throughput. A sequence of WTRUs is arranged in an order of decreasing normalized channel quality for each data priority. As much of the data as possible is scheduled for the WTRUs in the order of decreasing normalized channel quality of WTRUs. The scheduling is performed until there are no more physical resources available. Several of the WTRUs can be scheduled in the same transmission timing interval (TTI) if there are enough physical resources.

BRIEF DESCRIPTION OF THE DRAWING

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Hereafter, the terminology "WTRU" includes but is not limited to a user equipment (UE), a mobile station, a laptop, a personal data assistant (PDA), a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
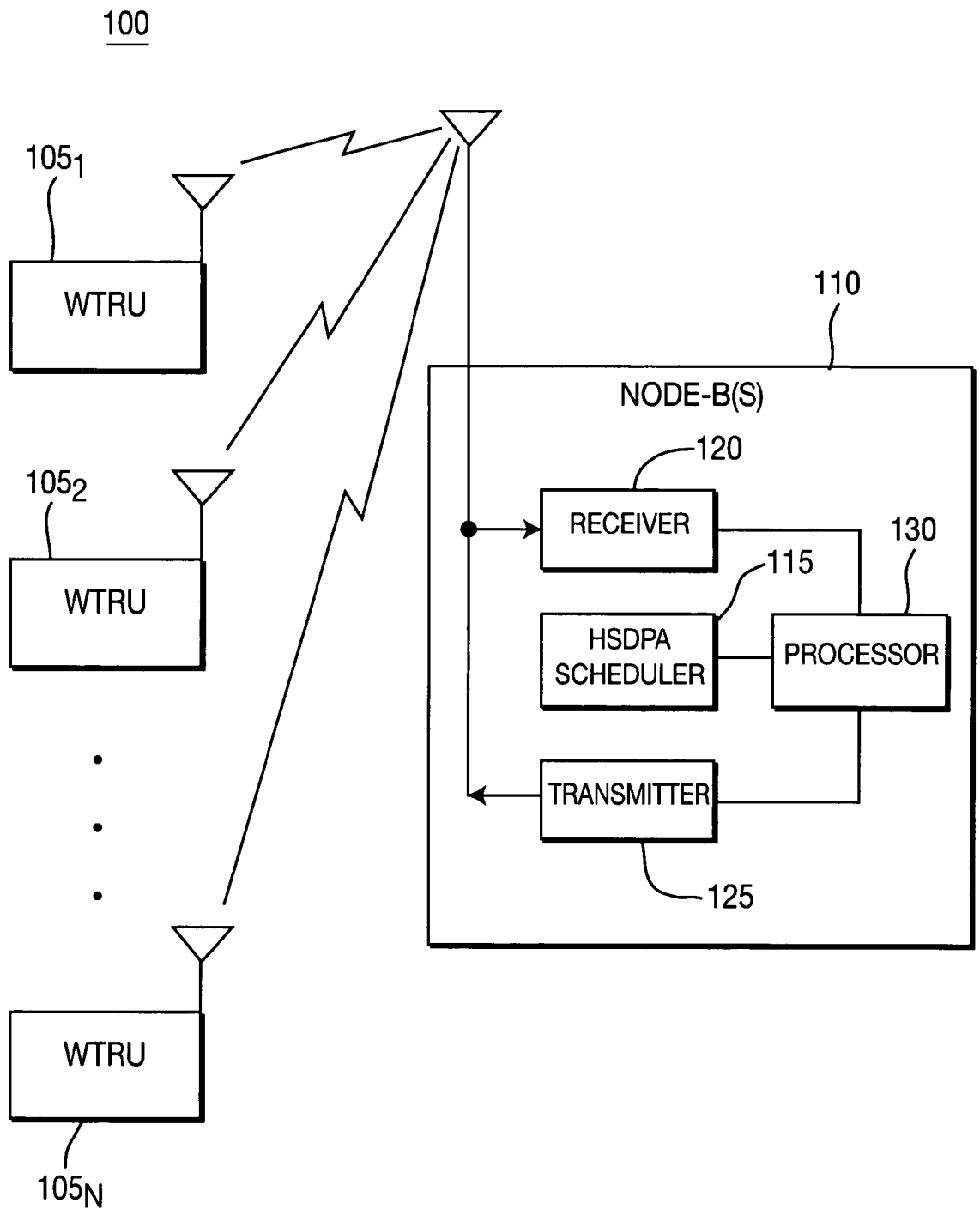
FIG. 1 is a block diagram of a wireless communication system including a plurality of WTRUs in communication with at least one Node-B in accordance with the present invention.

FIG. 1 is a block diagram of a wireless communication system 100 operating in accordance with the present invention. The system 100 includes a plurality of WTRUs $105_1$, $105_2$, ..., $105_N$ in communication with at least one Node-B 110. The Node-B 110 includes an HSDPA scheduler 115 that is responsible for the scheduling of HSDPA data. The Node-B 110 further includes a receiver 120, a transmitter 125 and a processor 130.

The present invention implements a practical proportionally fair scheduling algorithm and strategy for HSDPA in universal mobile telecommunications system frequency division duplex (UMTS-FDD) and UMTS-time division duplex (TDD) systems. By implementing a practical proportionally fair scheduling algorithm for HSDPA, high cell capacity can be achieved without affecting the fairness between users of the WTRUs $105_1, 105_2, \ldots, 105_N$.

The present invention uses normalized average active throughput, (average throughput divided by the data rate configured by the high layers), to normalize the channel quality. In this way, users of WTRUs $105_1, 105_2, \ldots, 105_N$ with different data rates will get fairness consistent with their data rates.

The normalized average active throughput of a WTRU 105 is a normalized throughput that is averaged over the active time when there is data for this WTRU 105 in the Node-B 110. Several users can be scheduled in the same TTI using a waterfilling manner if there are enough physical resources.

The practical proportionally fair scheduling algorithm is be used for HSDPA in UMTS systems. In order to achieve the goal of efficient utilization of physical resources and consistent performance among different WTRUs $105_1, 105_2, \ldots, 105_N$, a scheduling function that cleverly balances between instantaneous channel quality and fairness of users of the WTRUs $105_1, 105_2, \ldots, 105_N$ is used. The normalized channel quality is defined as:

$$\text{Normalized\_CQ} = \frac{(C/I)_i}{(R_{ave}(i)/R_{RAB}(i))}, \quad \text{Equation (1)}$$

where $(C/I)_i$ is the channel quality, (i.e., carrier to interference ratio), for a WTRU, (i.e., user), i which is provided to the Node-B 110 via a channel quality indicator (CQI) measurement by the WTRU 105, $R_{RAB}(i)$ is the expected data rate of a radio access bearer (RAB) associated with each WTRU i when configured by the RNC, and $R_{ave}(i)$ is the average throughput of each WTRU i over a specific time window up to the scheduling time instant. The time window only counts the active time when there are data for this user in the Node-B. Then, $$\frac{R_{ave}(i)}{R_{RAB}(i)}$$

can be regarded as the normalized average throughput of the WTRU i. The fairness is implied in the normalized average throughput within a specific time window.

If there are different priorities, the HSDPA scheduler 115 will consider the scheduling for the WTRUs $105_1, 105_2, \ldots, 105_N$ on a high speed downlink shared channel (HS-DSCH) in the order of priority (from the highest priority to the lowest priority). Within the same priority, scheduling for users is considered in the order of decreasing normalized channel quality in a water-filling manner. At first, the HSDPA scheduler 115 transmits as much data with this priority as possible for the WTRU 105 with the best normalized channel quality. If there are still physical resources available after scheduling the WTRU 105 with the best normalized channel quality, the WTRU 105 with the next best normalized channel quality will be scheduled, and so on.

Since only data for one WTRU 105 of the same priority can be transmitted in one TTI, once transmission of data is scheduled for a WTRU 105 at any priority level, this WTRU 105 will not be further considered for scheduling data at that priority level until the next TTI.

Figure 2:
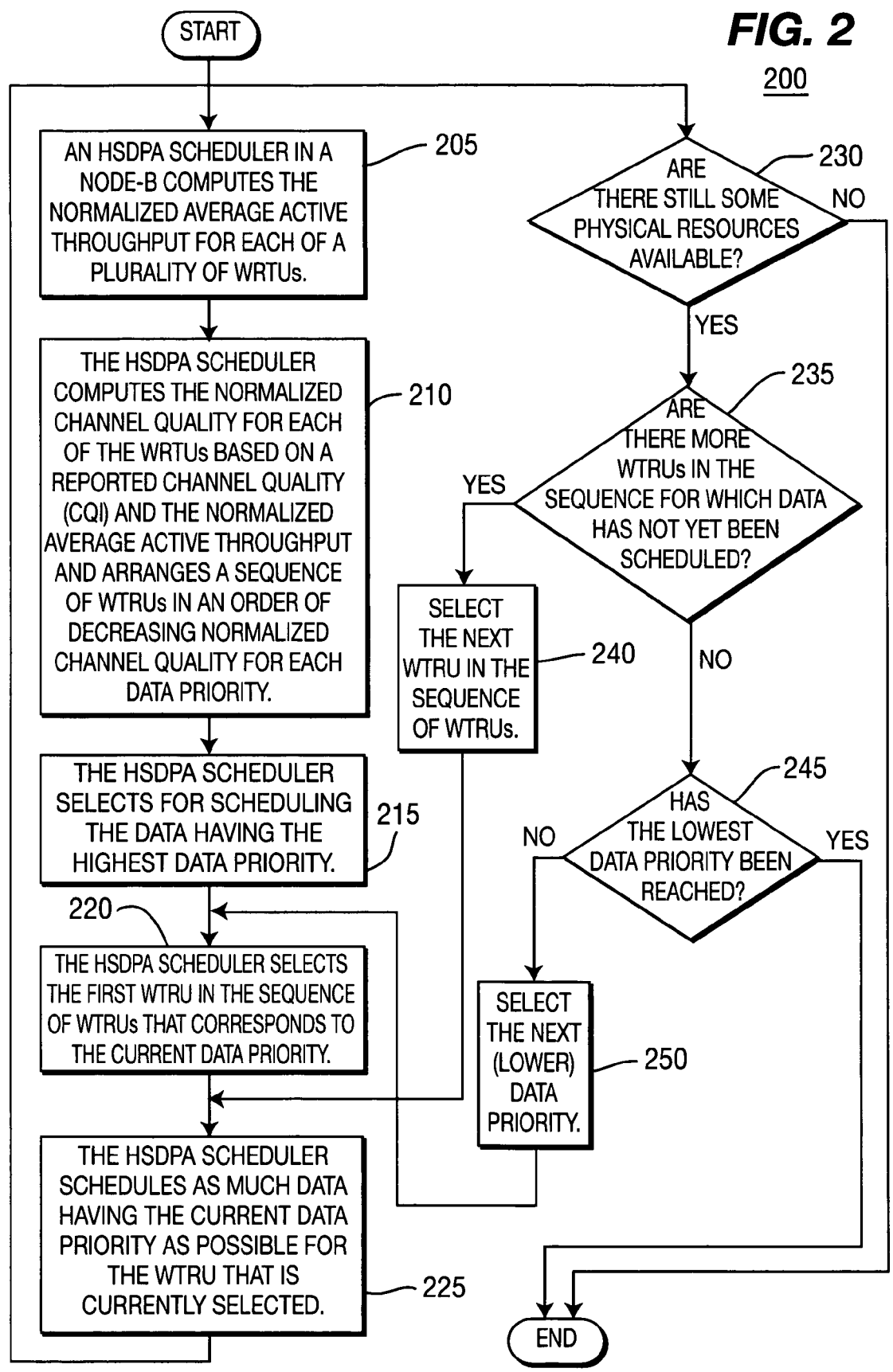
FIG. 2 is a flow diagram of a data scheduling process implemented by the Node-B in the wireless communication system of FIG. 1.

FIG. 2 is a flow diagram of a process 200 including method steps implemented by the Node-B 110 in the wireless communication system 100 of FIG. 1 for scheduling data in accordance with the present invention. In step 205, the HSDPA scheduler 115 computes the normalized average active throughput for each of the WTRUs $105_1, 105_2, \ldots, 105_N$ of the wireless communication 100 shown in FIG. 1. In step 210, the HSDPA scheduler 115 computes the normalized channel quality for each of the WTRUs $105_1, 105_2, \ldots, 105_N$ based on a reported CQI and the normalized average active throughput. The HSDPA scheduler 115 arranges a sequence of WTRUs in an order of decreasing normalized channel quality for each data priority. The HSDPA scheduler 115 determines which WTRU within the same priority, (determined by a radio resource control (RRC) configuration), should be scheduled first based on joint consideration of physical layer, (i.e., channel quality), and quality of service (QoS). In step 215, the HSDPA scheduler 115 selects for scheduling the data having the highest data priority. In step 220, the HSDPA scheduler 215 selects the first WTRU 105 in the sequence of WTRUs that corresponds to the current, (i.e., highest), data priority. In step 225, the HSDPA scheduler 115 schedules as much data having the current data priority as possible for the WTRU 105 that is currently selected, (i.e., the first WTRU in the sequence of WTRUs).

If, in step 230 of FIG. 2, it is determined that there are still some physical resources available, and if, in step 235, it is determined that there are more WTRUs 105 in the sequence of WTRUs for which data has not yet been scheduled, the next WTRU 105 in the sequence of WTRUs, (i.e., the user with next best normalized channel quality), is selected (step 240), and the process 200 returns to step 225 to schedule as much data having the current data priority as possible for the next WTRU 105 that is currently selected.

If, in step 235 of FIG. 2, it is determined that there are no more WTRUs 105 in the sequence for which data has not yet been scheduled and, in step 245, it is determined that the lowest priority has not yet been reached, the next (lower) data priority is selected at step 250, and the process 200 returns to step 220.

Figure 3:
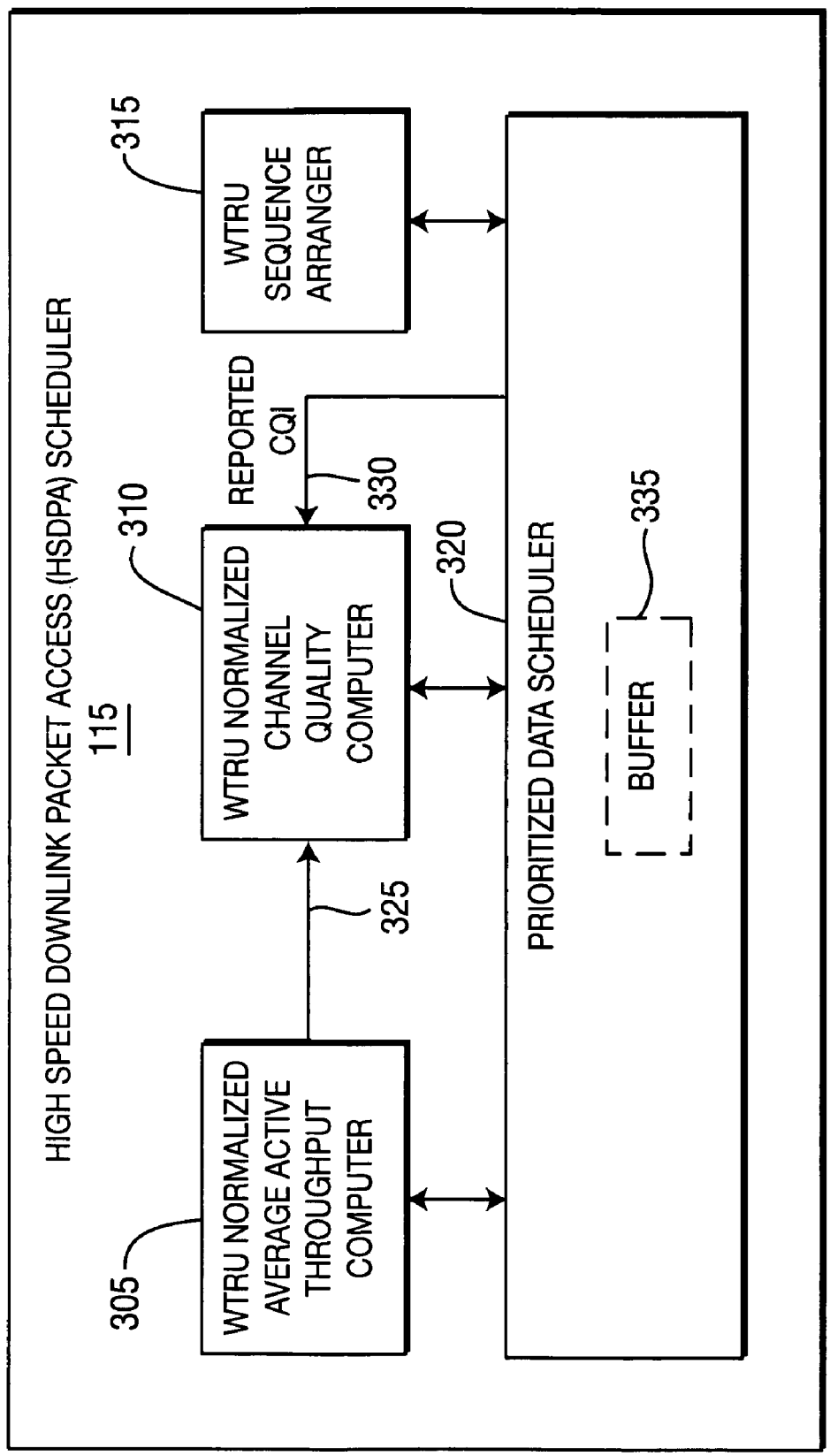
FIG. 3 is an exemplary block diagram of an HSDPA scheduler used in the Node-B of the wireless communication system of FIG. 1 to implement the data scheduling process of FIG. 2.

FIG. 3 is an exemplary block diagram of the HSDPA scheduler 115 used in the Node-B 110 of the wireless communication system of FIG. 1 to implement the data scheduling process of FIG. 2. The HSDPA scheduler 115 includes a first computer 305, a second computer 310, a WTRU sequence arranger 315 and a prioritized data scheduler 320.

The first computer 305 is configured to compute the normalized average active throughput for each of the WTRUs. The second computer 310 is configured to compute the normalized channel quality for each of the WTRUs based on a reported channel quality indicator (CQI) 330 and the respective normalized average active throughput 325 computed by the first computer 305. The WTRU sequence arranger 315 is configured to arrange a sequence of WTRUs in an order of decreasing normalized channel quality for each data priority. The prioritized data scheduler 320 is configured to schedule as much of the prioritized data as possible for the WTRUs in the order of decreasing normalized channel quality of WTRUs. The prioritized data scheduler 320 may optionally include a buffer 335 which stores the prioritized data. Alternatively, the Node-B 110 may include a separate buffer (not shown) that is connected to the processor 130.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of scheduling data having different priorities for transmission to a plurality of wireless transmit/receive units (WTRUs), the method comprising:

computing the normalized average active throughput for each of the WTRUs;

computing the normalized channel quality for each of the WTRUs based on a reported channel quality indicator (CQI) and the respective normalized average active throughput;

arranging a sequence of WTRUs in an order of decreasing normalized channel quality for each data priority; and scheduling as much of the data as possible for the WTRUs in the order of decreasing normalized channel quality of WTRUs, wherein the normalized channel quality is defined as $$\text{Normalized\_CQ}_i = \frac{(C/I)_i}{(R_{ave}(i)/R_{RAB}(i))},$$

where $(C/I)_i$ is the channel quality for each WTRU i, $R_{RAB}(i)$ is the expected data rate of a radio access bearer (RAB) associated with each WTRU i when configured by a radio network controller (RNC), and $R_{ave}(i)$ is the average throughput of each WTRU i over a specific time window up to the scheduling time instant.

2. The method of claim 1 wherein the scheduling is performed until there are no more physical resources available.

3. The method of claim 1 wherein the normalized average active throughput of a WTRU is a normalized throughput that is averaged over the active time when there is data allotted for the WTRU.

4. The method of claim 1 wherein several of the WTRUs can be scheduled in the same transmission timing interval (TTI) if there are enough physical resources.

5. The method of claim 1 wherein $$\frac{R_{ave}(i)}{R_{RAB}(i)}$$

is the normalized average throughput of each WTRU i.

6. A Node-B for scheduling data having different priorities for transmission to a plurality of wireless transmit/receive units (WTRUs), the Node-B comprising:

a first computer for computing the normalized average active throughput for each of the WTRUs;

a second computer for computing the normalized channel quality for each of the WTRUs based on a reported channel quality indicator (CQI) and the respective normalized average active throughput computed by the first computer;

a sequence arranger for arranging a sequence of WTRUs in an order of decreasing normalized channel quality for each data priority; and a prioritized data scheduler for scheduling as much of the prioritized data as possible for the WTRUs in the order of decreasing normalized channel quality of WTRUs, wherein the normalized channel quality is defined as $$\text{Normalized\_CQ}_i = \frac{(C/I)_i}{(R_{ave}(i)/R_{RAB}(i))},$$

where $(C/I)_i$ is the channel quality for each WTRU i, $R_{RAB}(i)$ is the expected data rate of a radio access bearer (RAB) associated with each WTRU i when configured by a radio network controller (RNC), and $R_{ave}(i)$ is the average throughput of each WTRU i over a specific time window up to the scheduling time instant.

7. The Node-B of claim 6 wherein the prioritized data scheduler schedules the prioritized data until there are no more physical resources available.

8. The Node-B of claim 6 wherein the normalized average active throughput of a WTRU is a normalized throughput that is averaged over the active time when there is data allotted for the WTRU.

9. The Node-B of claim 6 wherein several of the WTRUs can be scheduled in the same transmission timing interval (TTI) if there are enough physical resources.

10. The Node-B of claim 6 wherein $$\frac{R_{ave}(i)}{R_{RAB}(i)}$$

is the normalized average throughput of each WTRU i.

11. An integrated circuit (IC) incorporated in a Node-B for scheduling data having different priorities for transmission to a plurality of wireless transmit/receive units (WTRUs), the IC comprising:

a first computer for computing the normalized average active throughput for each of the WTRUs;

a second computer for computing the normalized channel quality for each of the users based on a reported channel quality indicator (CQI) and the respective normalized average active throughput computed by the first computer;

a sequence arranger for arranging a sequence of WTRUs in an order of decreasing normalized channel quality for each data priority; and a prioritized data scheduler for scheduling as much of the prioritized data as possible for the WTRUs in the order of decreasing normalized channel quality of WTRUs, wherein the normalized channel quality is defined as $$\text{Normalized\_CQ}_i = \frac{(C/I)_i}{(R_{ave}(i)/R_{RAB}(i))},$$

where $(C/I)_i$ is the channel quality for each WTRU i, $R_{RAB}(i)$ is the expected data rate of a radio access bearer (RAB) associated with each WTRU i when configured by a radio network controller (RNC), and $R_{ave}(i)$ is the average throughput of each WTRU i over a specific time window up to the scheduling time instant.

12. The IC of claim 11 wherein the prioritized data scheduler schedules the prioritized data until there are no more physical resources available.

13. The IC of claim 11 wherein the normalized average active throughput of a WTRU is a normalized throughput that is averaged over the active time when there is data allotted for the WTRU.

14. The IC of claim 11 wherein several of the WTRUs can be scheduled in the same transmission timing interval (TTI) if there are enough physical resources.

15. The IC of claim 11 wherein $$\frac{R_{ave}(i)}{R_{RAB}(i)}$$

is the normalized average throughput of each WTRU i.

* * * * *